(12) United States Patent
Nagai (10) Patent No.: US 7,453,411 B2
(45) Date of Patent: Nov. 18, 2008

(54) ANTENNA DEVICE AND RADAR APPARATUS INCLUDING THE SAME

(75) Inventor: Tomohiro Nagai, Nagaokakyo (JP)

(73) Assignee: Murata Manufacturing Co., Ltd (JP)

( * ) Notice: Subject to any disclaimer, the term of this patent is extended or adjusted under 35 U.S.C. 154(b) by 0 days.

(21) Appl. No.: 11/583,024

(22) Filed: Oct. 19, 2006

(65) Prior Publication Data

US 2007/0035461 A1    Feb. 15, 2007

Related U.S. Application Data

(63) Continuation of application No. PCT/JP2005/006238, filed on Mar. 31, 2005.

(30) Foreign Application Priority Data

May 21, 2004    (JP)    ............... 2004-151597

(51) Int. Cl.
*H01Q 13/00*    (2006.01)
(52) U.S. Cl.    ................ 343/781 P; 343/781 R
(58) Field of Classification Search ................ 343/757, 343/761, 763, 772, 781 R, 781 P
See application file for complete search history.

(56) References Cited

U.S. PATENT DOCUMENTS

| 4,305,075 A | * | 12/1981 | Salvat et al. | ................ 342/78 |
| 4,312,002 A | * | 1/1982 | Stewart | .................. 343/725 |
| 6,061,033 A | * | 5/2000 | Hulderman et al. | ... 343/781 CA |
| 6,396,448 B1 | * | 5/2002 | Zimmerman et al. | ........ 343/753 |
| 6,870,512 B2 | * | 3/2005 | Yoneda et al. | ........ 343/781 CA |
| 7,091,922 B2 | * | 8/2006 | Parsons et al. | ........... 343/781 P |

FOREIGN PATENT DOCUMENTS

| JP | 6 291541 | 10/1994 |
| JP | 8-321710 | 12/1996 |
| JP | 2693497 | 9/1997 |
| JP | 11-88029 | 3/1999 |
| JP | 11-303146 | 11/1999 |
| JP | 2004-112660 | 4/2004 |

OTHER PUBLICATIONS

Written Opinion dated May 31, 2005 (with English translation).
International Search Report dated May 31, 2005.

* cited by examiner

*Primary Examiner*—Trinh V Dinh
*Assistant Examiner*—Dieu Hien T Duong
(74) *Attorney, Agent, or Firm*—Dickstein, Shapiro, LLP.

(57) ABSTRACT

An antenna device having a primary radiator that includes a transmitting section formed of a cylindrical waveguide extending parallel to a direction in which the front of the antenna device faces (front direction), and a rectangular horn-shaped radiant section extending perpendicular to the front direction. A waveguide whose central axis in the extending direction corresponds to that of the transmitting section of the primary radiator is connected to an end of the transmitting section via a rotary joint so as to be rotatable. A first reflector is of an offset parabolic type, and is disposed above the primary radiator in a predetermined position with respect to the primary radiator such that a predetermined directivity is obtained. A second reflector is parabolic in the vertical direction, and is toric in the horizontal direction. The second reflector is disposed below the primary radiator in a predetermined position with respect to the primary radiator such that a predetermined directivity is obtained.

10 Claims, 11 Drawing Sheets

ANTENNA DEVICE AND RADAR APPARATUS INCLUDING THE SAME

CROSS REFERENCE TO RELATED APPLICATIONS

The present application is a continuation of International Application No. PCT/JP2005/006238, filed Mar. 31, 2005, which claims priority to Japanese Patent Application No. JP2004-151597, filed, May 21, 2004, the entire contents of each of these applications being incorporated herein by reference in their entirety.

FIELD OF THE INVENTION

The present invention relates to antenna devices that form beams by reflecting signals in a predetermined direction using reflectors, the signals being radiated from primary radiators that are mechanically rotated, and relates to radar apparatuses that detect targets in directions of the beam transmission using the antenna devices.

Background of the Invention

To date, car-mounted radar apparatuses have operated by transmitting beams formed by using millimeter-wave signals for detecting targets in detecting directions, and receiving signals reflected from the targets (hereinafter referred to as "reflected target signals") so as to detect the targets in detecting areas. Such radar apparatuses include primary radiators that radiate millimeter-wave signals from predetermined radiating surfaces, and reflectors that reflect the millimeter-wave signals radiated from the primary radiators along the detecting directions and guide the reflected target signals from the detecting areas to the primary radiators by reflection. Moreover, the beams of the millimeter-wave signals of the radar apparatuses need to be scanned in predetermined directions, for example, in the horizontal direction, in order to detect targets in detecting areas having predetermined widths. Therefore, known radar apparatuses employ an electronic scanning method in which scanning of the beams of the millimeter-wave signals to be transmitted is electrically controlled using phased array antennas, or a mechanical scanning method in which scanning of the beams of the millimeter-wave signals to be transmitted is mechanically controlled by rotating and translating the primary radiators or the reflectors.

In a known radar apparatus employing such a mechanical scanning method disclosed in Patent Document 1, primary radiators are disposed on a rotary shaft adjacent to the outer peripheral surface thereof so as to face outward, the rotary shaft being perpendicular to directions of beam transmission, and moreover, a reflector extending over a predetermined angle range is disposed in a position remote from the rotary shaft having the primary radiators by a predetermined distance. The shape of each of the reflectors is designed such that millimeter-wave signals can be transmitted within a desired angle range for scanning. In such a radar apparatus, transmission beams having a directivity in a predetermined direction are formed by reflecting signals radiated from the primary radiators using the reflector. When the primary radiators are rotated by the rotary shaft, directions along which radio waves are radiated from the primary radiators are rotated, and directions of reflection by the reflector are changed, thereby forming transmission beams having a predetermined strength and scanning within a predetermined angle range. Patent Document 1: Japanese Patent No. 2693497

However, the antenna device in the radar apparatus of a conventional mechanical scanning type as disclosed in Patent Document 1 includes only one reflector, and thus has only one directivity. Therefore, in order to realize a radar apparatus capable of detecting objects within a plurality of separate detecting areas, antenna devices having directivities corresponding to the detecting areas are required, resulting in an increase in the size of the radar apparatus.

SUMMARY OF THE INVENTION

Accordingly, an object of the present invention is to provide a small antenna device having a plurality of directivities and a radar apparatus including the antenna device.

An antenna device according to the present invention includes a primary radiator that radiates signals in directions different from a direction denoted by a rotation axis while being rotated; and a reflector that guides the signals radiated from the primary radiator to a direction of beam transmission of the antenna device by reflection, and guides reflected target signals from the direction of the beam transmission to the primary radiator by reflection. The antenna device is characterized in that the primary radiator is positioned such that the direction denoted by the rotation axis and the direction of the beam transmission substantially correspond to each other.

With this structure, the radiating direction of the signal located in the center of the solid angle formed by the signals radiated from the primary radiator is inclined with respect to the direction of the beam transmission of the antenna device by a predetermined angle, and is not parallel to the direction of the beam transmission. The radiated signals are formed into beams by the reflector, and transmitted in the direction of the beam transmission. At this time, the direction denoted by the rotation axis of the primary radiator and the direction of the beam transmission are substantially parallel to each other, and thus the reflector can be disposed at any position around a rotary shaft of the primary radiator remote from the outer peripheral surface of the rotary shaft in the outward direction.

Moreover, the antenna device according to the present invention is characterized in that the primary radiator is positioned such that the radiating direction of the primary radiator is inclined with respect to the direction denoted by the rotation axis by an angle of 30° or more.

With this structure, the radiating direction of the primary radiator is inclined with respect to the rotation axis by a predetermined angle or more, and therefore, setting of the position and the shape of the reflector that faces the radiant surface of the primary radiator are facilitated. That is, when the angle between the radiating direction and the rotation axis is small, the radiating direction of the signals radiated from the radiant surface of the primary radiator becomes almost parallel to the rotation axis. Therefore, there is almost no change in the radiating direction of the signals from the primary radiator even when the primary radiator is rotated. On the other hand, when the angle between the radiating direction and the rotation axis is large, i.e., becomes almost a right angle, the change in the radiating direction of the primary radiator becomes large. As a result, when a plurality of reflectors are used (described below), areas in which these reflectors can be arranged are expanded.

Moreover, the antenna device according to the present invention is characterized in that the reflector includes a plurality of reflectors. With this structure, each of the plurality of reflectors can form and transmit beams during one rotation of the primary radiator.

Moreover, the antenna device according to the present invention is characterized in that the plurality of reflectors have shapes that are different from each other. With this structure, the directivities of the beams formed by the plurality of reflectors during one rotation of the primary radiator can differ from each other due to the variation among the shapes of the reflectors.

Moreover, the antenna device according to the present invention is characterized in that the plurality of reflectors are disposed in positions different from each other with respect to the primary radiator. With this structure, the directivities of the beams can differ from each other due to the variation among the positions of the plurality of the reflectors, and the beams having directivities different from each other can be transmitted and received during one rotation of the primary radiator.

Moreover, the antenna device according to the present invention further includes a housing that accommodates the primary radiator and the reflector. With this structure, the housing can protect components of the antenna device from the external environment.

Moreover, the antenna device according to the present invention is characterized in that the reflector and the housing are integrated with each other. With this structure, the number of components of the antenna device can be reduced due to the integration of the housing with the reflectors.

Moreover, a radar apparatus according to the present invention includes the above-described antenna device; and detection-signal-generating means that generates signals to be radiated from the primary radiator and detection signals using the signals radiated from the primary radiator and the reflected target signals guided to the primary radiator.

With this structure, a radar apparatus having beams with desired directivities and detecting desired detecting areas can be realized by using the above-described antenna device. In particular, a radar apparatus capable of detecting objects within a plurality of detecting areas using only a single antenna device can be realized by providing the antenna device with a plurality of reflectors and by setting the shapes and positions of the reflectors such that the directivities of the beams formed using the signals reflected from the reflectors differ from each other.

According to the present invention, the radiating direction of the signal located in the center of the solid angle formed by the signals radiated from the primary radiator is inclined with respect to the direction of the beam transmission of the antenna device by a predetermined angle, and is not parallel to the direction of the beam transmission. In addition, the direction denoted by the rotation axis of the primary radiator and the direction of the beam transmission are substantially parallel to each other. Therefore, the reflector can be disposed at any position around the rotary shaft of the primary radiator remote from the outer peripheral surface of the rotary shaft in the outward direction. Thus, the layout of the plurality of reflectors having directivities different from each other is facilitated.

Moreover, according to the present invention, the radiating direction of the primary radiator is inclined with respect to the rotation axis by a predetermined angle or more, and therefore, setting of the position and the shape of the reflector that faces the radiant surface of the primary radiator are facilitated. With this, when a plurality of reflectors having directivities different from each other are arranged, areas in which these reflectors can be arranged are expanded, and furthermore, the layout of the reflectors is facilitated.

Moreover, according to the present invention, each of the plurality of reflectors can form and transmit beams during one rotation of the primary radiator. Thus, a plurality of beams having different directivities can be transmitted during one rotation of the primary radiator by using the plurality of reflectors having directivities of beams different from each other.

Moreover, according to the present invention, the directivities of the beams formed by the plurality of reflectors can differ from each other due to the variation among the shapes of the reflectors. Thus, an antenna device that transmits a plurality of beams having different directivities can be realized by using only one primary radiator.

Moreover, according to the present invention, the directivities of the beams can differ from each other due to the variation among the positions of the plurality of the reflectors with reference to the primary radiator, and the beams having directivities different from each other can be transmitted and received during one rotation of the primary radiator. Thus, an antenna device that transmits a plurality of beams having different directivities can be realized by using only one primary radiator.

Moreover, according to the present invention, the housing can protect the components of the antenna device from the external environment. Thus, an antenna device having an excellent durability can be realized in addition to the above-described effect of achieving the plurality of different directivities using only one primary radiator.

Moreover, according to the present invention, the number of components of the antenna device can be reduced due to the integration of the housing with the reflectors. Thus, an antenna device capable of being easily manufactured at low cost can be realized in addition to the effects of achieving the plurality of different directivities using only one primary radiator and, furthermore, achieving an excellent durability.

Moreover, according to the present invention, a radar apparatus having beams with desired directivities and detecting desired detecting areas can be realized by using the above-described antenna device. In particular, a radar apparatus capable of detecting objects within a plurality of detecting areas using only a single antenna device including only a single primary radiator can be realized by providing the antenna device with a plurality of reflectors and by setting the shapes and positions of the reflectors such that the directivities of the beams formed using the signals reflected from the reflectors differ from each other. Thus, a relatively small radar apparatus having a plurality of beam directivities, i.e., capable of detecting objects within a plurality of detecting areas can be realized.

REFERENCE NUMERALS 1 primary radiator
11 radiant section
12 transmitting section
2, 3, 7, 8, 9, and 10 reflectors
4 rotary joint
5 waveguide
6 motor
100 antenna device
200 circulator
300 mixer
400 coupler
401 dummy load
500 VCO
600 LNA

DETAILED DESCRIPTION OF THE INVENTION

An antenna device according to a first embodiment of the present invention will now be described with reference to FIGS. 1 to 6(d).

Figure 1:
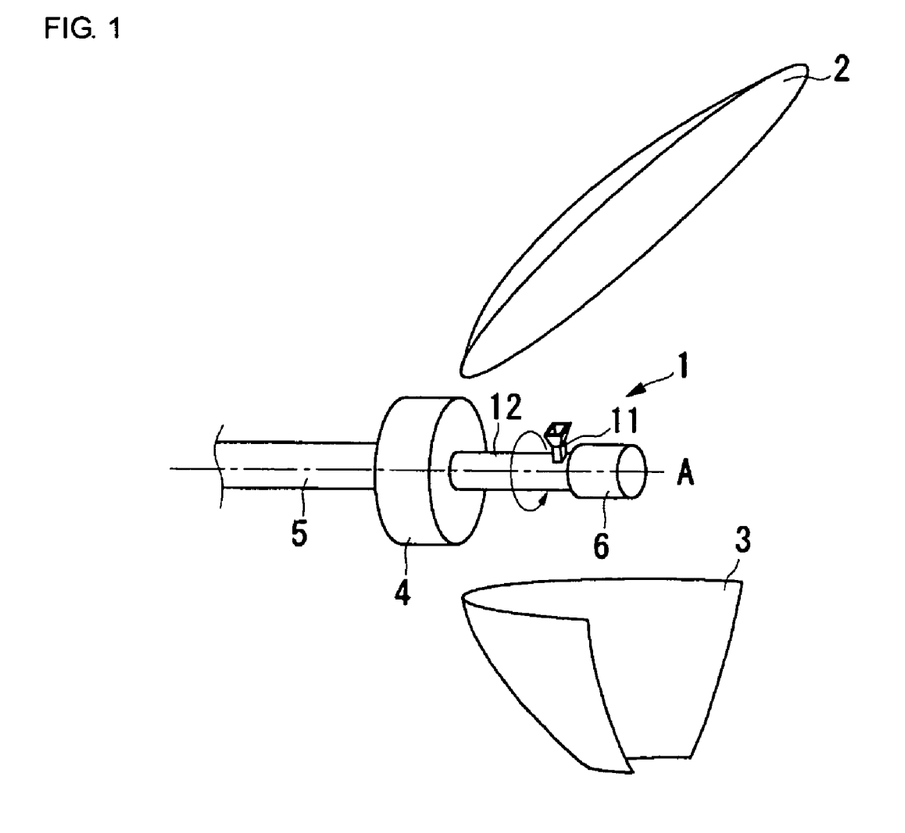
FIG. 1 is an external view of an antenna device according to a first embodiment.
Figure 2:
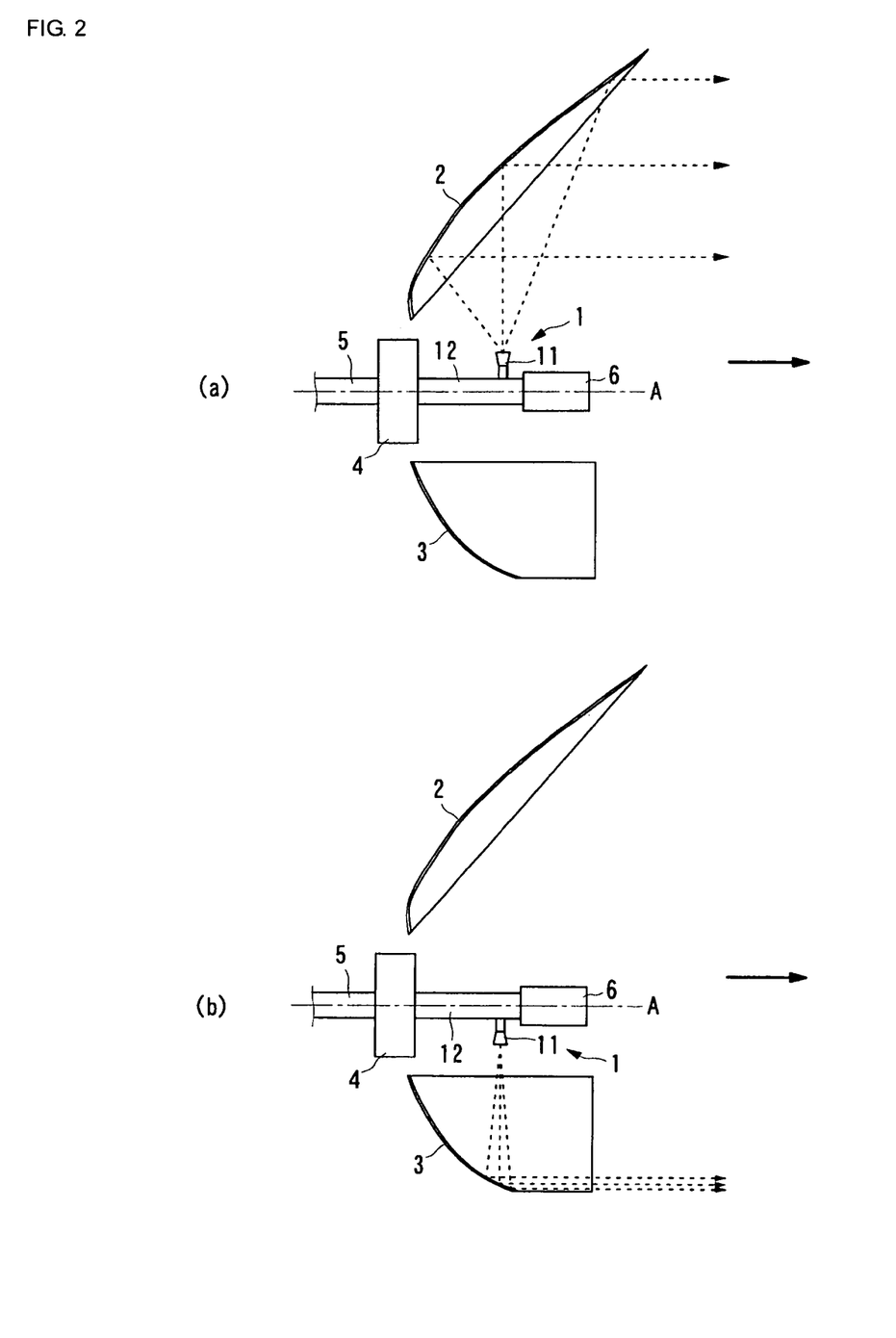
FIGS. 2(a) and 2(b) are side views of the antenna device according to the first embodiment.
Figure 3:
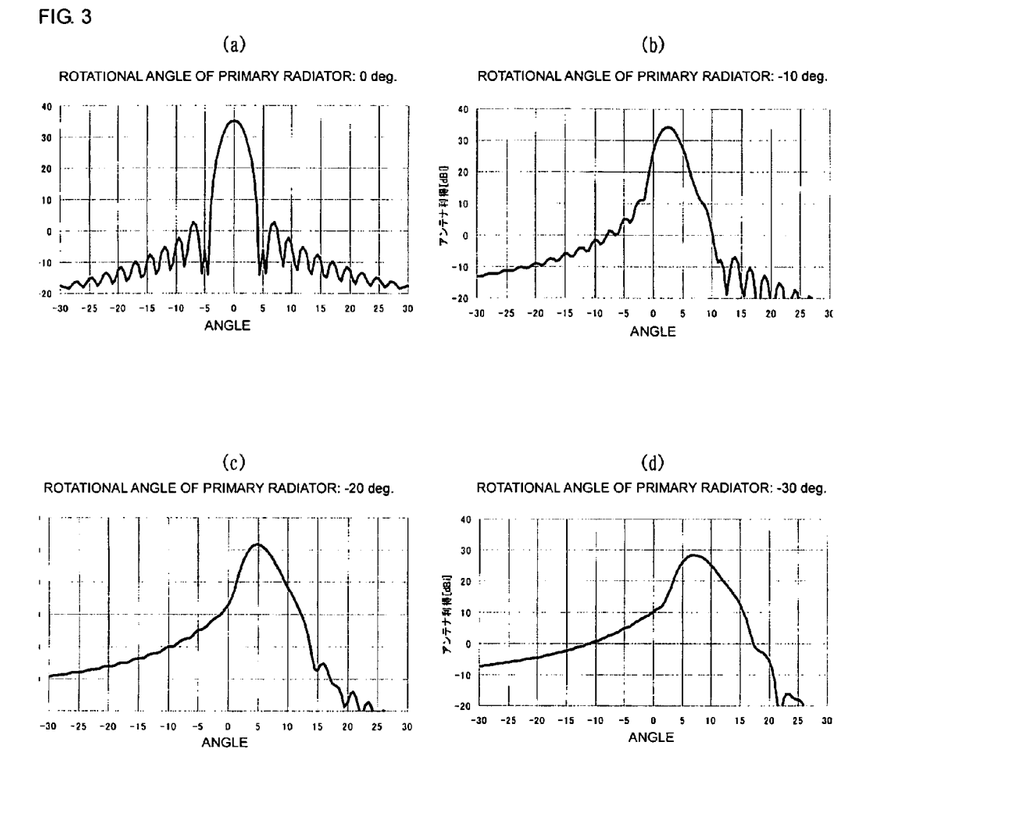
FIGS. 3(a) to 3(d) illustrate the relationship between the rotational angle of a primary radiator and the directivity of the antenna device when the radiant surface of the primary radiator faces a first reflector.
Figure 4:
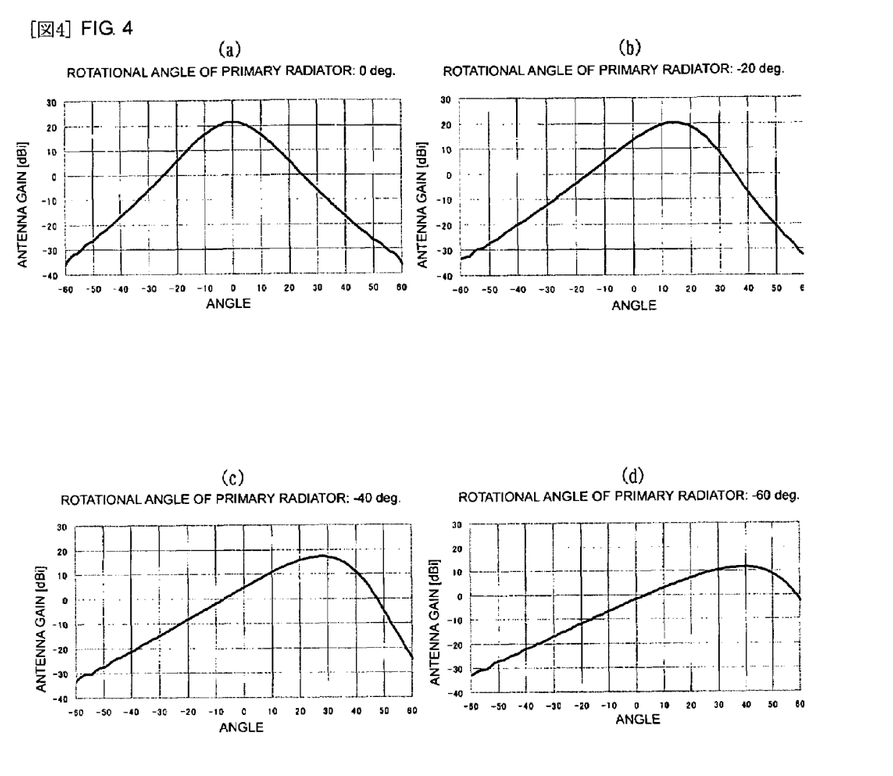
FIGS. 4(a) to 4(d) illustrate the relationship between the rotational angle of the primary radiator and the directivity of the antenna device when the radiant surface of the primary radiator faces a second reflector.
Figure 5:
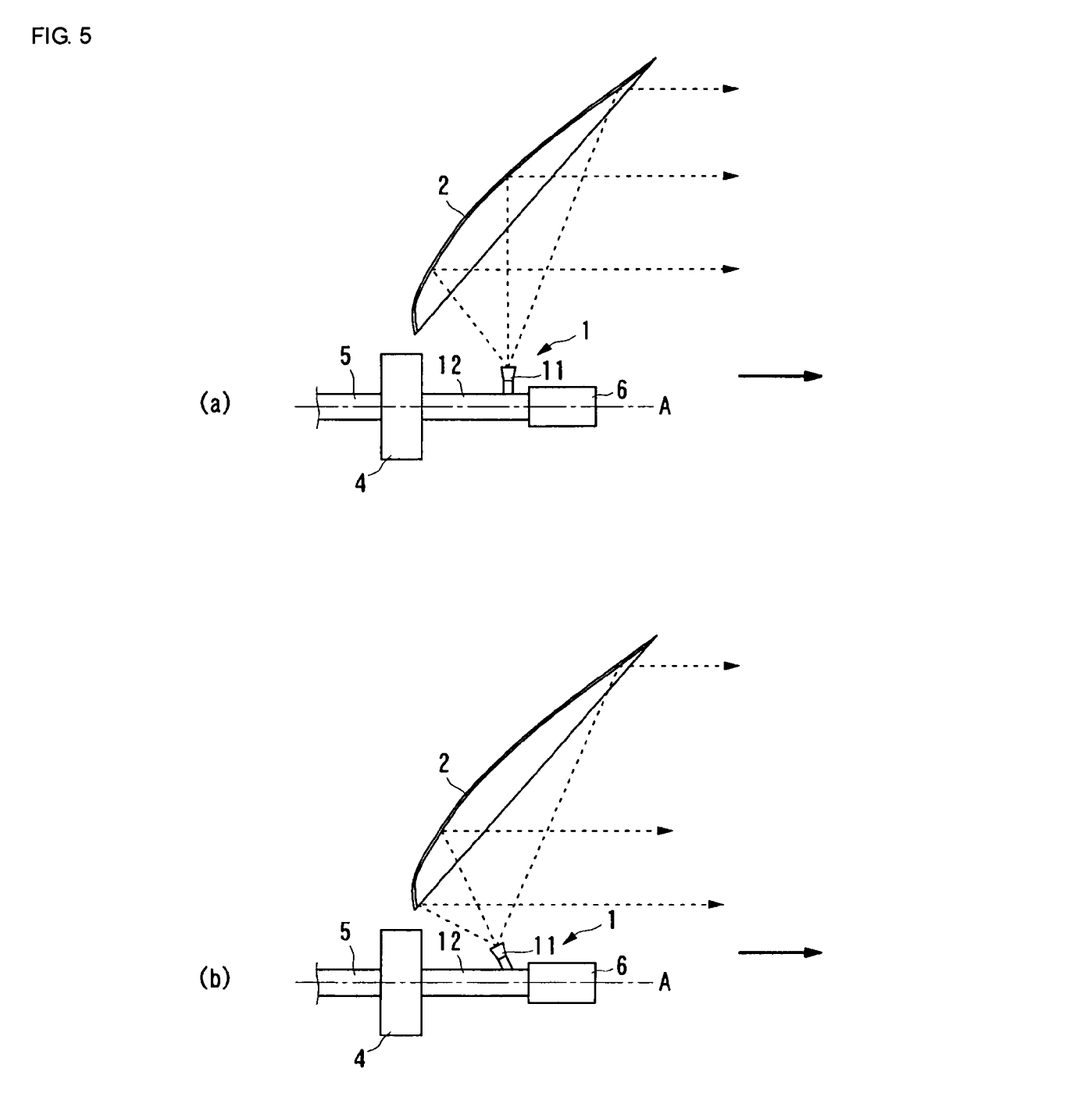
FIGS. 5(a) and 5(b) are side views illustrating the relative arrangement of the primary radiator and the reflector.
Figure 6:
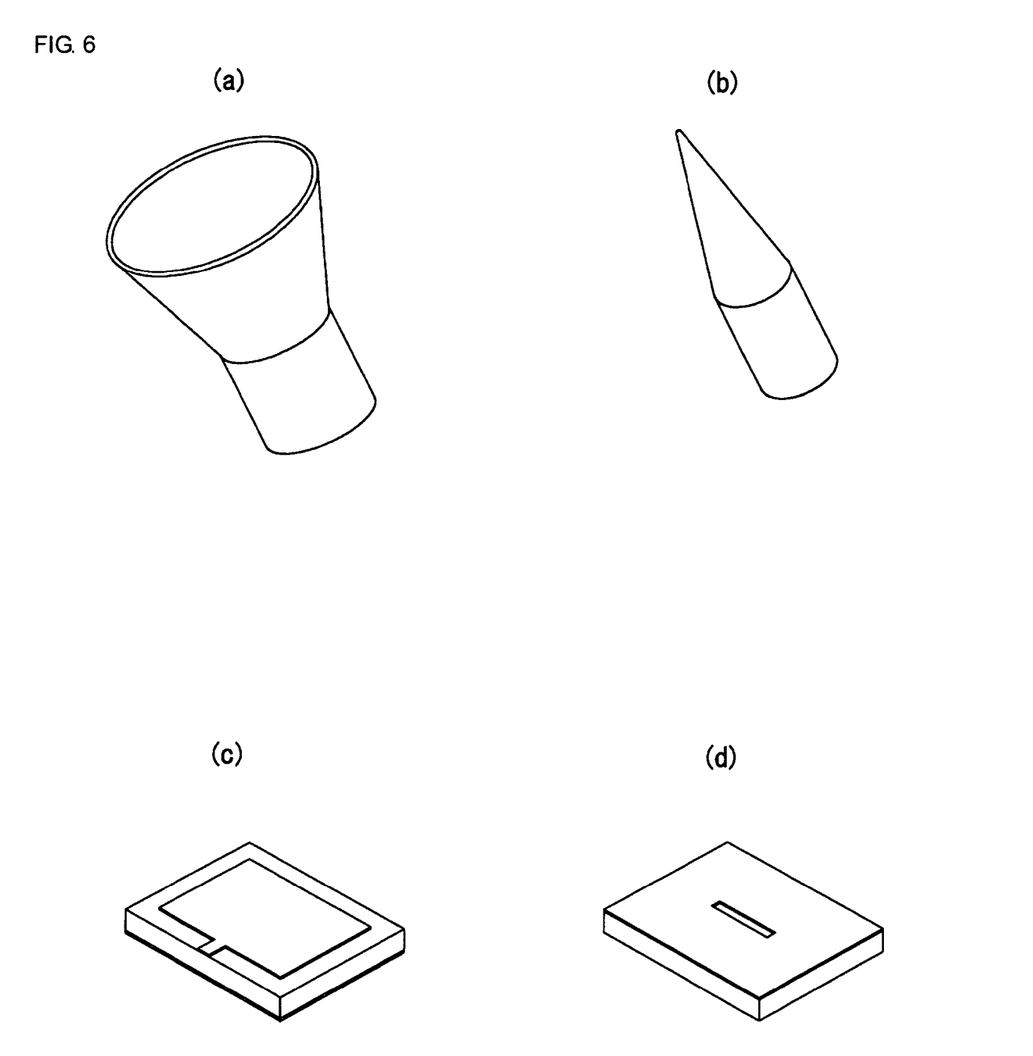
FIGS. 6(a) to 6(d) illustrate the shapes of various radiators.

FIG. 1 is an external view of the antenna device according to this embodiment.

Moreover, FIGS. 2(a) and 2(b) are side views of the antenna device according to this embodiment illustrating a state where a primary radiator 1 is directed to a reflector 2 and a state where the primary radiator 1 is directed to a reflector 3, respectively. Arrows with dotted lines in the drawings indicate directions along which millimeter-wave signals are radiated and directions along which transmission beams composed of the millimeter-wave signals are transmitted, and arrows with thick solid lines indicate the direction in which the front of the antenna device faces (front direction)

As shown in FIGS. 1, 2(a) and 2(b), the antenna device includes the primary radiator 1, the first reflector 2, the second reflector 3, a rotary joint 4, a waveguide 5, and a motor 6.

The primary radiator 1 includes a transmitting section 12 formed of a cylindrical waveguide having a predetermined diameter extending parallel to the front direction of the antenna device, and a rectangular horn-shaped radiant section 11 extending perpendicular to the front direction. The end face of the larger opening of the rectangular horn-shaped radiant section 11 is defined as a radiant surface, and that of the smaller opening is defined as a connecting surface connecting the radiant section 11 to the transmitting section 12. The radiant section 11 is connected to the transmitting section 12 at a predetermined distance from an end of the transmitting section 12 such that the direction along which the radiant section 11 extends and the direction along which the transmitting section 12 extends are perpendicular to each other. With this, the extending direction of the radiant section 11 of the primary radiator 1 becomes perpendicular to the front direction of the antenna device, and the radiant surface of the primary radiator 1 becomes perpendicular to a direction perpendicular to the front direction of the antenna device. As a result, the radiating direction of the signal located in the center of the solid angle formed by the signals radiated from the primary radiator 1 becomes perpendicular to the front direction of the antenna device. At this time, the transmitting section 12 may be a coaxial waveguide or a circular dielectric waveguide.

Moreover, the waveguide 5 whose central axis in the extending direction corresponds to that of the transmitting section 12 is connected to the other end of the transmitting section 12 of the primary radiator 1 via the rotary joint 4 so as to be rotatable, the radiant section 11 being connected to the transmitting section 12 remote from the other end, and the motor 6 that rotates the primary radiator 1 about the central axis of the transmitting section 12 serving as a rotation axis A is disposed on the end of the transmitting section 12, the radiant section 11 being connected to the transmitting section 12 adjacent to the end. With this, the primary radiator 1 radiates signals such that the radiating direction of the signal located in the center of the solid angle corresponds to a direction that is perpendicular to the front direction of the antenna device (the direction parallel to the rotation axis A) and is inclined according to the rotational angle. That is, signals can be radiated in the radial direction on a plane perpendicular to the front direction of the antenna device by rotating the primary radiator 1.

The first reflector 2 is of a so-called offset parabolic type having a shape formed by cutting a circle having a predetermined diameter from a paraboloid of revolution having a predetermined focal length, and is disposed above the primary radiator 1 in a predetermined position with respect to the primary radiator 1 such that a predetermined directivity is obtained. Specifically, the first reflector 2 is disposed in a position such that the directivity of beams formed by reflection by the first reflector 2 becomes the strongest in a direction exactly perpendicular to the front surface (in the front direction and at an angle of 0° in the horizontal direction) of the antenna device when the radiant section 11 of the primary radiator 1 is located at a position pointing vertically upward with respect to the transmitting section 12.

The second reflector 3 is parabolic in the vertical direction, and is toric in the horizontal direction. The second reflector 3 is disposed below the primary radiator 1 in a predetermined position with respect to the primary radiator 1 such that a predetermined directivity is obtained. Specifically, the second reflector 3 is disposed in a position such that the directivity of beams formed by reflection by the second reflector 3 becomes the strongest in the direction exactly perpendicular to the front surface (in the front direction and at an angle of 0° in the horizontal direction) of the antenna device when the radiant section 11 of the primary radiator 1 is located at a position pointing vertically downward with respect to the transmitting section 12.

In this antenna device, when millimeter-wave signals for detection are transmitted via the waveguide 5, the millimeter-wave signals are transmitted to the transmitting section 12 of the primary radiator 1, and are radiated from the radiant surface of the radiant section 11 such that the radiating direction of the signal located in the center of the solid angle corresponds to a direction perpendicular to the front direction of the antenna device. At this time, when the radiant surface of the primary radiator 1 faces the first reflector 2, millimeter-wave signals radiated from the radiant surface of the primary radiator 1 are reflected by the first reflector 2. Since the first reflector 2 has a shape that forms beams traveling in the front direction of the antenna device and having a directivity that is strong in a narrow angle range in the horizontal direction by reflection, the beams of the millimeter-wave signals reflected by the first reflector 2 are transmitted to an area of a narrow range in the front direction of the antenna.

If a target exists in a detecting area of the beams formed by the first reflector 2 in the front direction of the antenna, the transmitted millimeter-wave signals are reflected by the target, and transmitted toward the antenna device. The reflected target signals are reflected by the first reflector 2, and received by the radiant surface of the primary radiator 1. The reflected target signals are transmitted from the radiant section 11 and the transmitting section 12 of the primary radiator 1 to the waveguide 5, and output from the waveguide 5 to an external circuit.

At this time, the characteristics of the beams formed by reflection of the millimeter-wave signals by the first reflector 2, i.e., the directivities, is changed by the relative positions of the reflecting surface of the first reflector 2 and the radiant surface of the primary radiator 1. Therefore, the directivity is changed by the rotation of the primary radiator 1.

FIGS. 3(a) to 3(d) illustrate the relationship between the rotational angle of the primary radiator 1 and the directivity of the antenna device when the radiant surface of the primary radiator 1 faces the first reflector 2. The rotational angle of the primary radiator 1, i.e., the relative positions of the reflecting surface of the first reflector 2 and the radiant surface of the primary radiator 1, varies in FIGS. 3(a) to 3(d). The angle shown in the abscissa in the drawings indicates an angle formed in the horizontal direction with respect to a reference direction of 0°, the direction exactly perpendicular to the front of the antenna device being defined as the reference direction. Moreover, the rotational angle of the primary radiator in the drawings is an angle formed with respect to a reference direction of 0°, the direction when the primary radiator 1 faces vertically upward being defined as the reference direction. Furthermore, the frequency of the millimeter-wave signals in use is 76 GHz, which is the same as that used for car-mounted radar apparatuses.

As clearly shown in FIGS. 3(a) to 3(d), the angle in the horizontal direction at which the antenna gain peaks is changed by the rotation of the primary radiator 1. With this, beams that scan in the horizontal direction can be formed. Specifically, in the case of FIGS. 3(a) to 3(d), an antenna device having an antenna gain of 35 dBi in the front direction (the direction of 0°) and capable of scanning in a range up to approximately ±7° in the horizontal direction can be realized. Thus, targets located at positions up to approximately 150 m in the front direction and in a scanning angle range of ±7° in the horizontal direction can be detected.

On the other hand, when the radiant surface of the primary radiator 1 faces the second reflector 3, the millimeter-wave signals radiated from the radiant surface of the primary radiator 1 are reflected by the second reflector 3. Since the second reflector 3 has a shape that forms beams traveling in the front direction of the antenna device and having a directivity that is strong in an angle range in the horizontal direction wider than that of the beams formed by the first reflector 2 by reflection, the beams of the millimeter-wave signals reflected by the second reflector 3 are transmitted to an area in a wide angle range in the front direction of the antenna.

If a target exists in a detecting area of the beams formed by the second reflector 3 in the front direction of the antenna, the transmitted millimeter-wave signals are reflected by the target, and transmitted toward the antenna device. The reflected target signals are reflected by the second reflector 3, and intensively received by the radiant surface of the primary radiator 1. The reflected target signals are transmitted from the radiant section 11 and the transmitting section 12 of the primary radiator 1 to the waveguide 5, and output from the waveguide 5 to the external circuit.

At this time, the characteristics of the beams formed by reflection of the millimeter-wave signals by the second reflector 3, i.e., the directivities, is changed by the relative positions of the reflecting surface of the second reflector 3 and the radiant surface of the primary radiator 1. Therefore, the directivity is changed by the rotation of the primary radiator 1.

FIGS. 4(a) to 4(d) illustrate the relationship between the rotational angle of the primary radiator 1 and the directivity of the antenna device when the radiant surface of the primary radiator 1 faces the second reflector 3. The rotational angle of the primary radiator 1, i.e., the relative positions of the reflecting surface of the second reflector 3 and the radiant surface of the primary radiator 1, varies in FIGS. 4(a) to 4(d). The angle shown in the abscissa in the drawings indicates an angle formed in the horizontal direction with respect to a reference direction of 0°, the direction exactly perpendicular to the front of the antenna device being defined as the reference direction. Moreover, the rotational angle of the primary radiator in the drawings is an angle formed with respect to a reference direction of 0°, the direction when the primary radiator 1 faces vertically downward being defined as the reference direction. Furthermore, the frequency of the millimeter-wave signals in use is 76 GHz, which is the same as that used for car-mounted radar apparatuses.

As clearly shown in FIGS. 4(a) to 4(d), the angle in the horizontal direction at which the antenna gain peaks is changed by the rotation of the primary radiator 1 more significantly than in the case of the first reflector 2. With this, beams that scan in a wider angle range in the horizontal direction can be formed. Specifically, in the case of FIGS. 4(a) to 4(d), an antenna device having an antenna gain of 22 dBi in the front direction (the direction of 0°) and capable of scanning in a range up to approximately ±40° in the horizontal direction can be realized. Thus, targets located at positions up to approximately 40 m in the front direction and in a scanning angle range of ±40° in the horizontal direction can be detected.

With the above-described structure according to this embodiment, an antenna device having a plurality of directivities using only one primary radiator can be realized. With this, for example, a remote target in a narrow range including the direction exactly perpendicular to the front and a close target in a wider range described above in the examples can be detected during one rotation of the primary radiator.

In the description above, the radiating direction of the primary radiator (the direction along which the radiant section extends) is perpendicular to the rotation axis A (the front direction of the antenna device). However, the angle between the radiating direction and the rotation axis A may be an angle in the range from 30° to less than 90° as shown in FIG. 5(b), the angle not being a very small acute angle. FIGS. 5(a) and 5(b) are side views illustrating the relative arrangement of the primary radiator and the reflector. Arrows with dotted lines in the drawings indicate directions along which millimeter-wave signals are radiated and directions along which transmission beams composed of the millimeter-wave signals are transmitted, and arrows with thick solid lines indicate the front direction. With this, flexibility in designing the focal length, depth, and diameter of the reflector is improved, and thus flexibility in the layout of the primary radiator and the reflector is improved. As a result, an antenna device having desired antenna characteristics can be easily realized.

Moreover, in the description above, the shapes of the reflectors are a paraboloid of revolution and a torus. However, any shapes may be applied to the above-described structure as long as the desired characteristics are obtained. Examples of such reflectors may include:

(1) Those having modified mirror-finished surfaces for desired directivities (2) Those having compositions of a torus and a paraboloid of revolution (3) Those having compositions of a plurality of paraboloids of revolution These reflectors can be formed by methods such as die-casting, cutting, forging, resin-coating, vapor deposition, wire braiding, and printing.

Moreover, in the description above, the radiant section of the primary radiator has a rectangular horn shape. However, radiators having various shapes shown in FIGS. 6(a) to 6(d) may be employed.

FIGS. 6(a) to 6(d) illustrate the shapes of various radiators such as a circular horn-shaped radiator, a rod-shaped dielectric radiator, a patch antenna, and a slot antenna, respectively.

The above-described effects can also be produced by using primary radiators having these structures.

Next, an antenna device according to a second embodiment will be described with reference to FIGS. 7(a) and 7(b).

Figure 7:
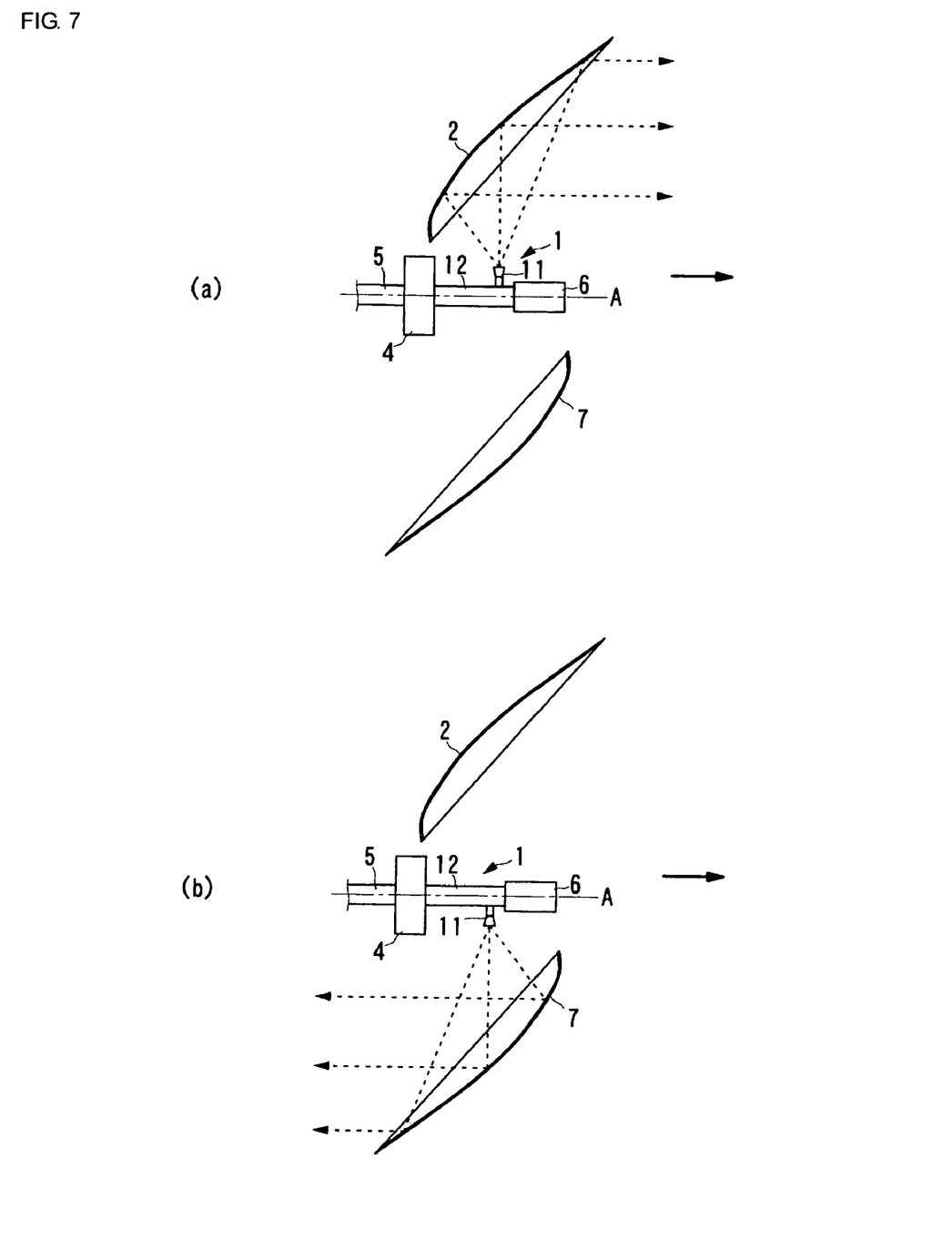
FIGS. 7(a) and 7(b) are side views illustrating schematic structures of an antenna device according to a second embodiment.

FIGS. 7(a) and 7(b) are side views illustrating schematic structures of the antenna device according to this embodiment. Arrows with dotted lines in the drawings indicate directions along which millimeter-wave signals are radiated and directions along which transmission beams composed of the millimeter-wave signals are transmitted, and arrows with thick solid lines indicate the front direction.

As shown in FIGS. 7(a) and 7(b), the antenna device according to this embodiment includes a first reflector 2 and a third reflector 7 having the same shape disposed above and below a primary radiator 1, respectively, so as to be disposed symmetrically with respect to a focal point that exists in the primary radiator 1. Structures other than this are the same as those in the first embodiment. With this, the reflecting surface of the first reflector 2 is directed in the front direction of the antenna, and the reflecting surface of the third reflector 7 is directed in the direction in which the back of the antenna faces (back direction). In this embodiment, the focal point corresponds to a point of intersection of the central line along which a radiant section 11 of the primary radiator 1 extends and the central line along which a transmitting section 12 extends. With this structure, the first reflector 2 disposed above the primary radiator 1 can form beams traveling in the front direction of the antenna, and the third reflector 7 disposed below the primary radiator 1 can form beams traveling in the back direction of the antenna. With this, beams traveling forward and backward are formed during one rotation of the primary radiator 1, and forward detection and backward detection can be realized by using only one antenna device.

In the description above, the two reflectors have the same shape, but may have different shapes. In this case, the positions of the reflectors with respect to the primary radiator may be determined such that desired antenna characteristics (directivities) are obtained.

Moreover, in the description above, the reflectors are positioned such that the reflector disposed above the primary radiator transmits beams in the front direction and the reflector disposed below the primary radiator transmits beams in the back direction. However, the reflectors may be positioned such that the upper reflector transmits beams in the back direction and the lower reflector transmits beams in the front direction.

Next, an antenna device according to a third embodiment will be described with reference to FIGS. 8(a) and 8(b).

Figure 8:
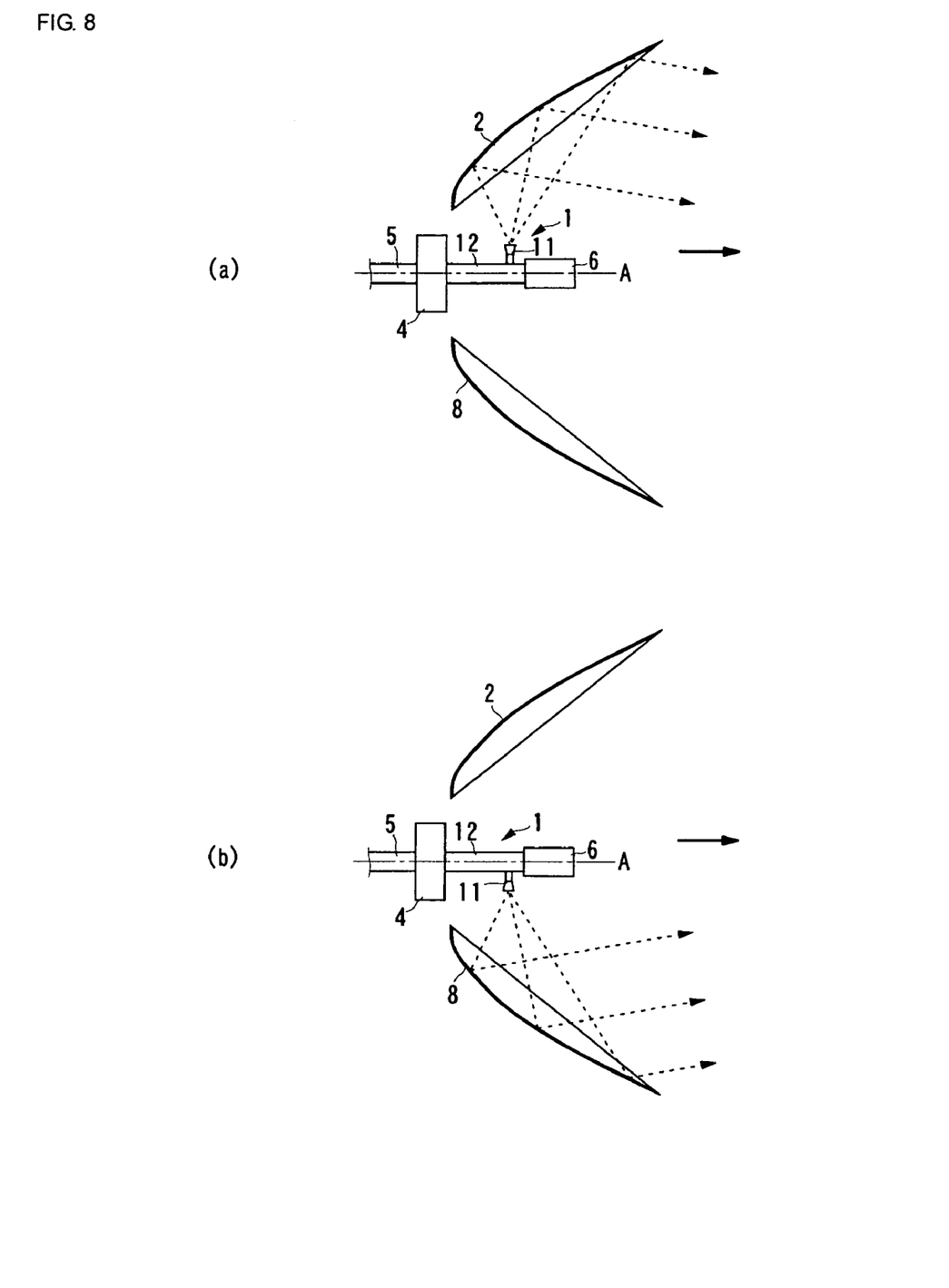
FIGS. 8(a) and 8(b) are side views illustrating schematic structures of an antenna device according to a third embodiment.

FIGS. 8(a) and 8(b) are side views illustrating schematic structures of the antenna device according to this embodiment. Arrows with dotted lines in the drawings indicate directions along which millimeter-wave signals are radiated and directions along which transmission beams composed of the millimeter-wave signals are transmitted, and arrows with thick solid lines indicate the front direction.

The antenna device shown in FIGS. 8(a) and 8(b) includes a first reflector 2 disposed above a primary radiator 1, and a fourth reflector 8 disposed below the primary radiator 1 so as to be axisymmetric to the first reflector 2 with respect to a rotation axis A of the primary radiator 1. Beams formed by reflection of the first reflector 2 travel obliquely downward in the front direction, and beams formed by reflection of the fourth reflector 8 travel obliquely upward in the front direction. Structures other than this are the same as those in the antenna device according to the first embodiment. With this structure, an antenna device that transmits beams upward and downward in the front direction substantially at the same time can be realized. With this, forward detection and vertical (upward and downward) detection can be realized by using only one antenna device.

In the description above, the first reflector 2 and the fourth reflector 8 have substantially the same shape, but may have different shapes.

Next, an antenna device according to a fourth embodiment will be described with reference to FIG. 9.

Figure 9:
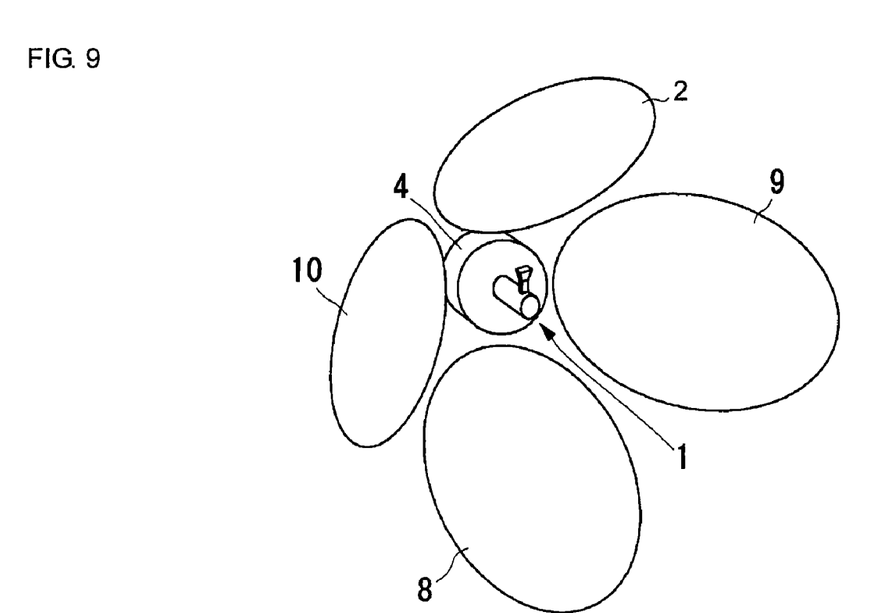
FIG. 9 is an external view illustrating a schematic structure of an antenna device according to a fourth embodiment.

FIG. 9 is an external view illustrating a schematic structure of the antenna device according to this embodiment.

The antenna device shown in FIG. 9 includes a first reflector 2 disposed above a primary radiator 1, a fourth reflector 8 disposed below the primary radiator 1, a fifth reflector 9 disposed at the right of the primary radiator 1, and a sixth reflector 10 disposed at the left of the primary radiator 1. The fifth reflector 9 and the sixth reflector 10 each have a predetermined directivity in the front direction of the antenna device. Structures other than this are the same as those in the antenna device according to the first embodiment. With this structure, the first reflector 2 and the fourth reflector 8 form beams that scan in the horizontal direction in the front direction of the antenna, and the fifth reflector 9 and the sixth reflector 10 form beams that scan in the vertical direction in the front direction of the antenna. With this, an antenna device capable of scanning in the horizontal direction and in the vertical direction during one rotation of the primary radiator can be realized.

Four reflectors are used in this embodiment, but the number of reflectors may be three or more in order to obtain desired characteristics.

Furthermore, in this embodiment, all the reflectors are positioned so as to form beams that travel in the front direction. However, as described in the second embodiment, the plurality of reflectors may be separately used for the reflection in the front direction and in the back direction. For example, the reflectors disposed above and at the right of the primary radiator 1 may be used for the reflection in the front direction, and the reflectors disposed below and at the left of the primary radiator may be used for the reflection in the back direction. Thus, an antenna device capable of horizontal and vertical scanning in the front direction and horizontal and vertical scanning in the back direction during one rotation of the primary radiator can be realized.

Next, an antenna device according to a fifth embodiment will be described with reference to FIG. 10.

Figure 10:
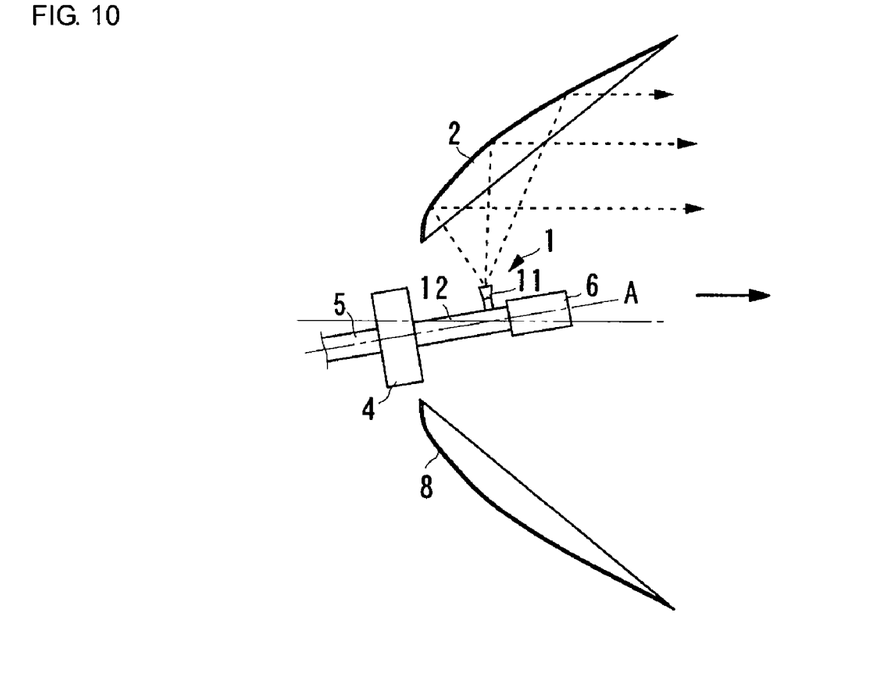
FIG. 10 is a side view illustrating a schematic structure of an antenna device according to a fifth embodiment.

FIG. 10 is a side view illustrating a schematic structure of the antenna device according to this embodiment. Arrows with dotted lines in the drawings indicate directions along which millimeter-wave signals are radiated and directions along which transmission beams composed of the millimeter-wave signals are transmitted, and an arrow with a thick solid line indicates the front direction.

As shown in FIG. 10, the antenna device according to this embodiment includes a primary radiator that is positioned such that a rotation axis A of the primary radiator is inclined by a predetermined angle with respect to the horizontal direction. Structures other than this are the same as those in the antenna device according to the third embodiment. With this structure, flexibility in the relative positions of the primary radiator and the reflectors, i.e., the layout of the components of the antenna device is improved. This structure can be applied not only to the third embodiment but also to the other embodiments described above.

Next, an antenna device according to a sixth embodiment will be described with reference to FIG. 11.

Figure 11:
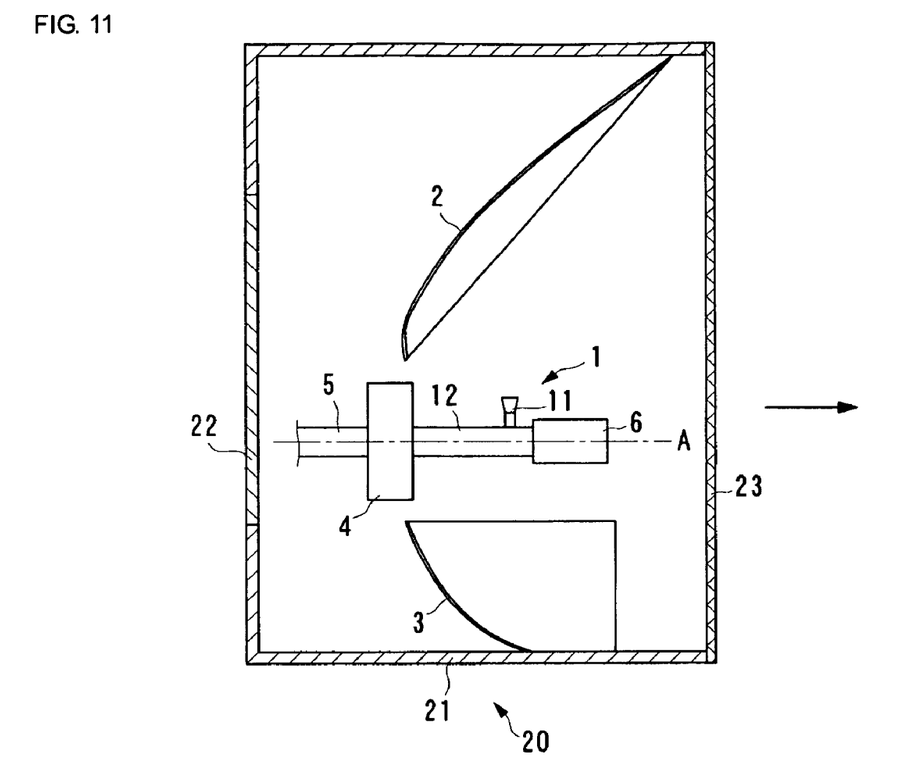
FIG. 11 is a side view illustrating a schematic structure of an antenna device according to a sixth embodiment.

FIG. 11 is a side view illustrating a schematic structure of the antenna device according to this embodiment. An arrow with a thick solid line in the drawing indicates the front direction.

As shown in FIG. 11, the antenna device according to this embodiment includes a housing 20 accommodating a primary radiator 1, a first reflector 2, a second reflector 3, a rotary joint 4, a waveguide 5, and a motor 6. Structures other than this are the same as those in the antenna device according to the first embodiment. The housing 20 includes a side wall 21 that covers the upside, downside, right side, and left side of the above-described components, a back cover 22 that covers the backside of the antenna device, and a radome 23 that covers the front side of the antenna device. The side wall 21 of the housing 20 is integrated with the first reflector 2 and the second reflector 3.

With this structure, the components of the antenna device are protected from the external environment, resulting in an antenna device having an excellent durability. Moreover, since the housing and the reflectors are integrated with each other, the number of components of the antenna device can be reduced, resulting in an antenna device easily manufactured at low cost.

The reflectors and the housing are integrated with each other in this embodiment, but may be separately formed and then assembled together.

Moreover, in this embodiment, the components (functional parts) of the antenna device are accommodated in the housing. However, functional parts of a radar apparatus described below may be disposed in the housing. With this, a radar apparatus having an excellent durability can be realized.

Next, a radar apparatus according to a seventh embodiment will be described with reference to FIG. 12.

Figure 12:
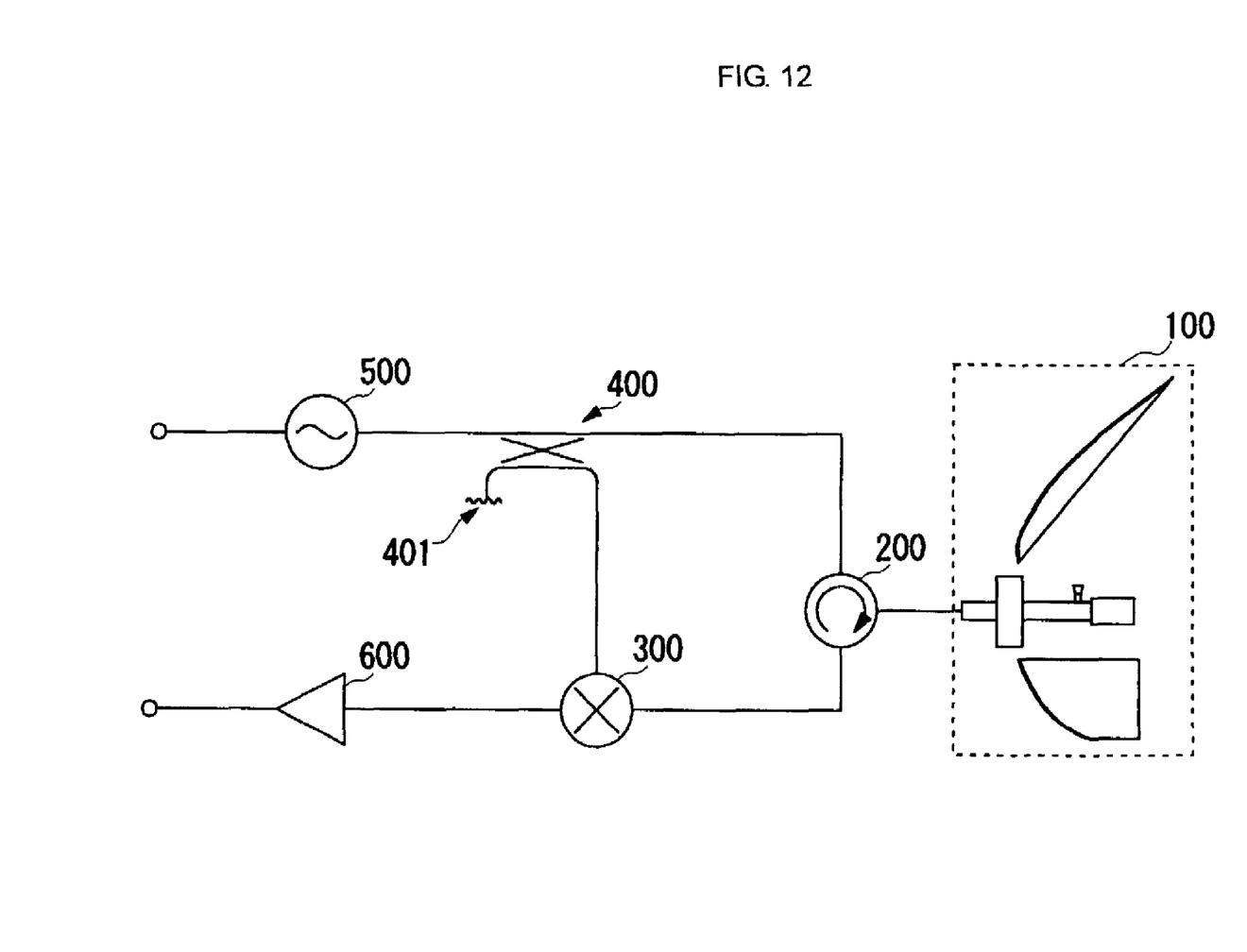
FIG. 12 is a block diagram illustrating a schematic structure of a radar apparatus according to a seventh embodiment.

FIG. 12 is a block diagram illustrating a schematic structure of the radar apparatus according to this embodiment.

As shown in FIG. 12, the radar apparatus according to this embodiment includes an antenna device 100, a circulator 200, a mixer 300, a coupler 400, a dummy load 401, a VCO 500, and an LNA 600. An antenna device according to any one of the above-described embodiments is used as the antenna device 100. Herein, the circulator 200, the mixer 300, the coupler 400, the dummy load 401, VCO 500, and the LNA 600 correspond to "detection-signal-generating means" of the present invention.

Millimeter-wave signals generated by the VCO 500 are transmitted to the antenna device 100 via the coupler 400 and the circulator 200. The antenna device 100 forms transmission beams in target detection areas as described above, and receives target detection signals reflected from a target. The target detection signals received by the antenna device 100 are input to the mixer 300 via the circulator 200. The mixer 300 receives a part of the signals transmitted from the VCO 500 via the coupler 400 as local signals, and outputs frequency components of the difference between the target detection signals and the local signals as IF signals. The LNA 600 amplifies the IF signals, and outputs the signals to a detection-data-generating circuit (not shown) disposed downstream.

In this manner, the radar apparatus including the above-described antenna device can form beams having a plurality of directivities using only one primary radiator. Thus, a small radar apparatus capable of detecting objects within a plurality of detection areas can be realized.

Moreover, as described above, a small radar apparatus having an excellent durability can be realized by arranging the components of the radar apparatus such as the circulator 200, the mixer 300, the coupler 400, the dummy load 401, the VCO 500, and the LNA 600 in the housing of the antenna device.

The invention claimed is:

1. An antenna device comprising:
   a rotatable primary radiator that radiates signals in directions different from a rotation axis thereof; and
   a plurality of reflectors that directly receive the signals radiated from the primary radiator, guide the signals radiated from the primary radiator in a beam transmission direction of the antenna device by reflection, and guide reflected target signals from the beam transmission direction to the primary radiator by reflection, wherein
   only one reflector of the plurality of reflectors receives the signals radiated from the primary radiator at a time,
   the primary radiator is positioned such that the rotation axis and the beam transmission direction are substantially aligned with each other, and the radiating direction of the primary radiator is inclined with respect to the rotation axis by an angle of 30° or more, and
   the plurality of reflectors have shapes that are different from each other.

2. The antenna device according to claim 1, wherein the plurality of reflectors are disposed in positions different from each other with respect to the primary radiator.

3. The antenna device according to claim 1, wherein the primary radiator includes a transmission portion and a radiation portion.

4. The antenna device according to claim 3, wherein the radiation portion is one of a rectangular horn, a circular horn, a dielectric rod radiator, a patch antenna and a slot antenna.

5. The antenna device according to claim 3, wherein the radiation portion extends in a direction substantially perpendicular to the rotation axis.

6. The antenna device according to claim 1, wherein the primary radiator is positioned such that the radiating direction of the primary radiator is substantially perpendicular to the rotation axis.

7. The antenna device according to claim 1, further comprising a housing that accommodates the primary radiator and the plurality of reflectors.

8. The antenna device according to claim 7, wherein the plurality of reflectors and the housing are integrated with each other.

9. A radar apparatus comprising:
   the antenna device according to claim 1; and a detection-signal-generator generating signals to be radiated from the primary radiator, and detection signals using the signals radiated from the primary radiator and the reflected target signals guided to the primary radiator.

10. The antenna device according to claim 1, wherein the rotation axis and the beam transmission direction are substantially parallel to each other.

* * * * *